United States Patent [19]

Jones

[11] Patent Number: 4,890,952

[45] Date of Patent: Jan. 2, 1990

[54] SAWBUCK CONSTRUCTION AND BRACKET

[76] Inventor: Richard G. Jones, 200 Sunset Hollow Rd., West Chester, Pa. 19380

[21] Appl. No.: 166,995

[22] Filed: Mar. 11, 1988

[51] Int. Cl.[4] .................................................. F16B 7/00

[52] U.S. Cl. ..................................... 403/172; 403/175; 403/217; 182/185

[58] Field of Search ............... 403/217, 218, 175, 174, 403/178, 170, 172, 219, 188, 191; 182/185, 183, 224, 184, 181, 186, 225, 226, 154, 155, 153; 256/64

[56] References Cited

U.S. PATENT DOCUMENTS

| | | | |
|---|---|---|---|
| 860,161 | 7/1907 | Thomas | 182/185 |
| 1,241,137 | 9/1917 | Mitchell | 403/191 |
| 1,998,520 | 4/1935 | Penote | 256/64 |
| 2,018,539 | 10/1935 | Welsh | 403/218 |
| 2,736,614 | 2/1956 | Brewster | 182/185 |
| 2,932,028 | 4/1960 | Saul, Sr. | 403/175 X |
| 3,175,642 | 3/1965 | Neeley | 182/185 |
| 3,333,875 | 8/1967 | Tracy | 403/170 |
| 3,445,129 | 3/1969 | Penote | 182/185 |
| 4,133,412 | 1/1979 | Hildebrandt | 182/154 |
| 4,189,247 | 2/1980 | Burwall | 403/172 X |
| 4,192,406 | 3/1980 | Mitchell | 182/185 |
| 4,294,561 | 10/1981 | Chapman et al. | 403/219 |
| 4,296,835 | 10/1981 | Koffski | 182/185 |
| 4,421,434 | 12/1983 | Magner | 403/175 |
| 4,449,842 | 5/1984 | Reichman, Jr. | 403/217 X |
| 4,638,885 | 1/1987 | Frederick | 182/181 X |
| 4,685,576 | 8/1987 | Hobson | 403/217 X |
| 4,730,698 | 3/1988 | Harris | 182/153 |

*Primary Examiner*—Andrew V. Kundrat
*Assistant Examiner*—Peter M. Cuomo
*Attorney, Agent, or Firm*—Robert C. Podwil

[57] ABSTRACT

A sawbuck is constructed of short lengths of lumber, and comprises a horizontal rail member disposed between and interconnecting a pair of end supports. The end supports are made up of metal brackets, which provide angularly disposed sockets for arms and legs and an additional socket for an end of the rail member. The brackets are fabricated from sheet metal, preferably joined by rivets or the like.

2 Claims, 3 Drawing Sheets

SAWBUCK CONSTRUCTION AND BRACKET

BACKGROUND OF THE INVENTION

This invention relates generally to a sawbuck construction, and more particularly, to a sawbuck construction and a simple, inexpensive and structurally secure bracket for positioning, interconnecting and maintaining the structural members of a sawbuck in a desired spatial and structural relationship.

Sawbuck constructions and brackets for assembling sawbucks have heretofore been proposed. For example, Reichman U.S. Pat. No. 4,449,842, issued May 22, 1984, discloses an arrangement involving a sleeve bracket constructed of three mutually perpendicular sleeves, each sleeve having open ends for receiving a frame member.

Brackets for securing structural members in trestles, sawhorses, scaffolds and the like have also been proposed. For example, Thomas U.S. Pat. No. 860,161, issued July 16, 1907, discloses an adjustable trestle in which structural members pass through and are secured to box-like end blocks or castings. In Brewster U.S. Pat. No. 2,736,614, issued Feb. 28, 1956, preformed brackets, provided with a recess to receive a top rail and forming sleeves to receive legs, facilitate assembly of a trestle. Other means for constructing trestles, scaffolds and the like are illustrated in Neeley U.S. Pat. No. 3,175,642, issued Mar. 30, 1965; Penote U.S. Pat. No. 3,445,129, issued May 20, 1969, and Koffski U.S. Pat. No. 4,296,835 issued Oct. 27, 1981.

In the apparatus of the Reichman patent, the framing members which form the legs and arms of a sawbuck must be secured to the sleeve bracket by nails or screws, and in the Brewster apparatus, frictional or other structural engagement between the legs of the assembly and the horizontal rail is required to maintain the integrity of the structure. In the patent to Thomas, among others, a set screw is proposed to prevent the legs from slipping with respect to the end block. No such techniques are needed with the present invention.

SUMMARY OF THE INVENTION

In general, the present invention relates to a simple, economical and reliable sawbuck construction and its components. In accordance with the invention, the sawbuck comprises a pair of end supports, each of which has supporting legs and load-retaining arms, interconnected by a horizontal rail member. In accordance with the invention, the end supports are made up of structurally simple sleeve brackets, designed to receive and retain, without the need for fasteners, undue manipulation or special tools, the structural members which comprise the supporting legs, load retaining arms and rail member. In this regard, the end supports are configured to provide angularly upwardly and angularly downwardly oriented socket portions, so dimensioned and configured as to permit easy but relatively secure slidable engagement with the structural members and to maintain the structural members in desired a spatial orientation. The upwardly oriented socket portions provide for maintenance of the load retaining arms in an upwardly opening "V" configuration, so that the end supports provide in effect, a cradle for receiving in the direction of the rail member logs or other work pieces. Similarly, the angularly downwardly oriented socket portions of the sleeve brackets provide a generally inverted "V" orientation for the legs, thus creating a secure base and platform for the entire structure.

The sleeve brackets also have openings which are, in effect, sockets for the reception of respective ends of the rail member. The rail member, in engaging the respective sleeve brackets, joins the end supports in stable self-supporting and free-standing structure.

In the presently preferred form of the invention, the sleeve brackets are fabricated from a pair of preformed shell portions, created by stamping or other suitably simple manufacturing processes. The shell portions, which preferably are identical (thus resulting in economies in manufacture), are interconnected, preferably by rivets but perhaps by other means, to form the completed sleeve brackets. The sleeve brackets are so formed as to have rear wall portions and spaced generally parallel side wall portions extending from the rear wall portions. The rear wall portions in the preferred embodiment have upper and lower portions, disposed with respect to each other in a shallow "V". Recesses in the side wall portions provide aligned openings which define the sockets for the ends of the rail member. Flanges associated with the side wall portions and disposed generally parallel to the rear wall portions define the socket portions which receive the above-mentioned leg and arm members.

A sawbuck made in accordance with the present invention may be assembled with no nails, screws or other fasteners, and can be made in fact using short lengths of scrap lumber, merely by trimming the lumber to size and inserting pieces of appropriate lengths in the proper socket portions of the sleeve brackets.

In instances in which the rail member is relatively long, an intermediate support may be placed on the rail member, again without the need for fasteners, to support medial portions of work pieces received in the sawbuck.

There are seen in the drawings forms of the invention which are presently preferred (and which represent the best mode contemplated for carrying the invention into effect), but it should be understood that the invention is not limited to the precise arrangements and instrumentalities shown.

Figure 1:
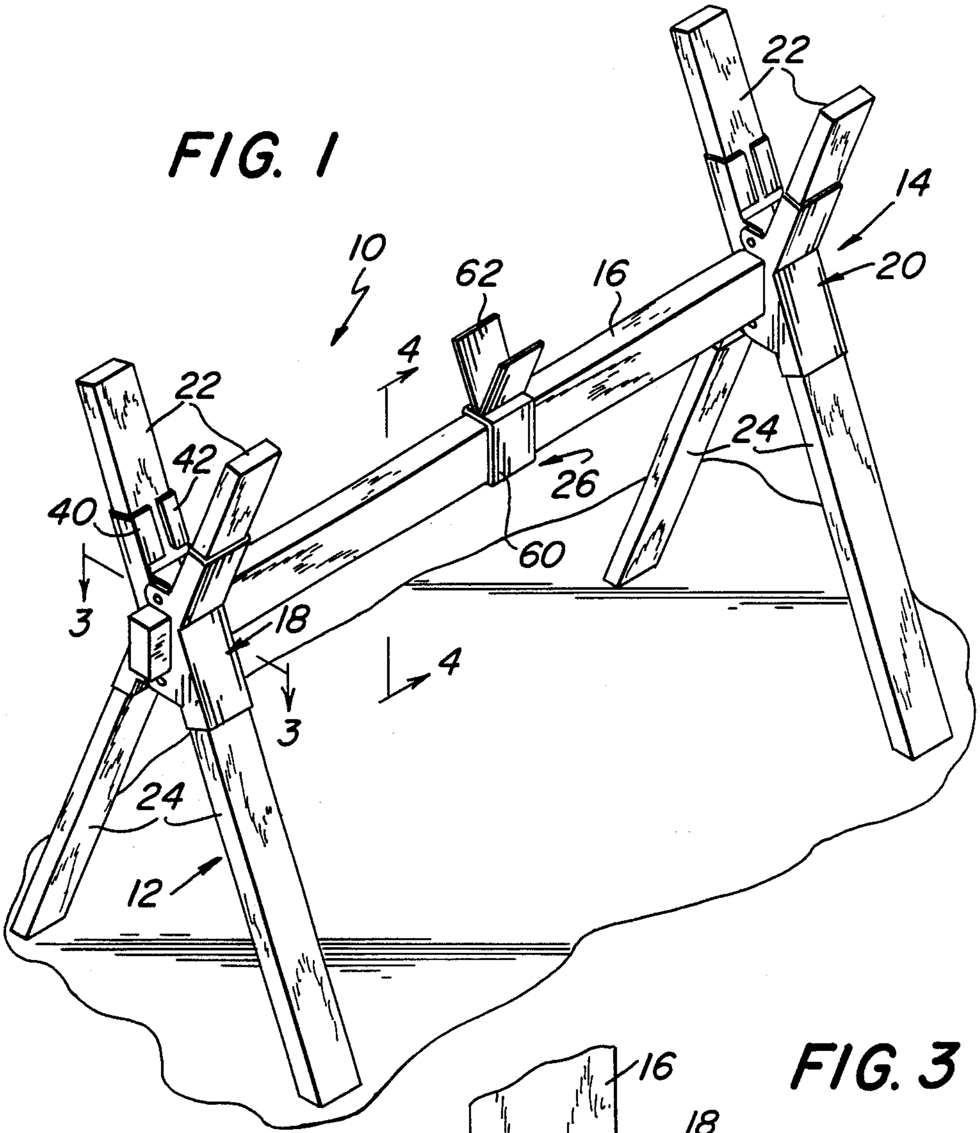
FIG. 1 is a perspective view of a sawbuck in accordance with the present invention.

Referring now to the drawings in detail, wherein like reference numerals indicate like elements, there is seen in FIG. 1 a sawbuck designated generally by the reference numeral 10. The sawbuck 10 is made up of a spaced pair of end supports, designated generally by the reference numerals 12 and 14, interconnected by a horizontal rail member 16.

The end supports 12, 14 comprise sleeve brackets 18, 20, which receive and retain, in a manner which will be described in detail below, upwardly extending load-retaining arms 22 and downwardly extending ground or floor-engaging legs 24. In instances in it is expedient, such as where the rail member 16 is relatively long, an intermediate support 26 may be associated with the rail member 16.

Figure 2:
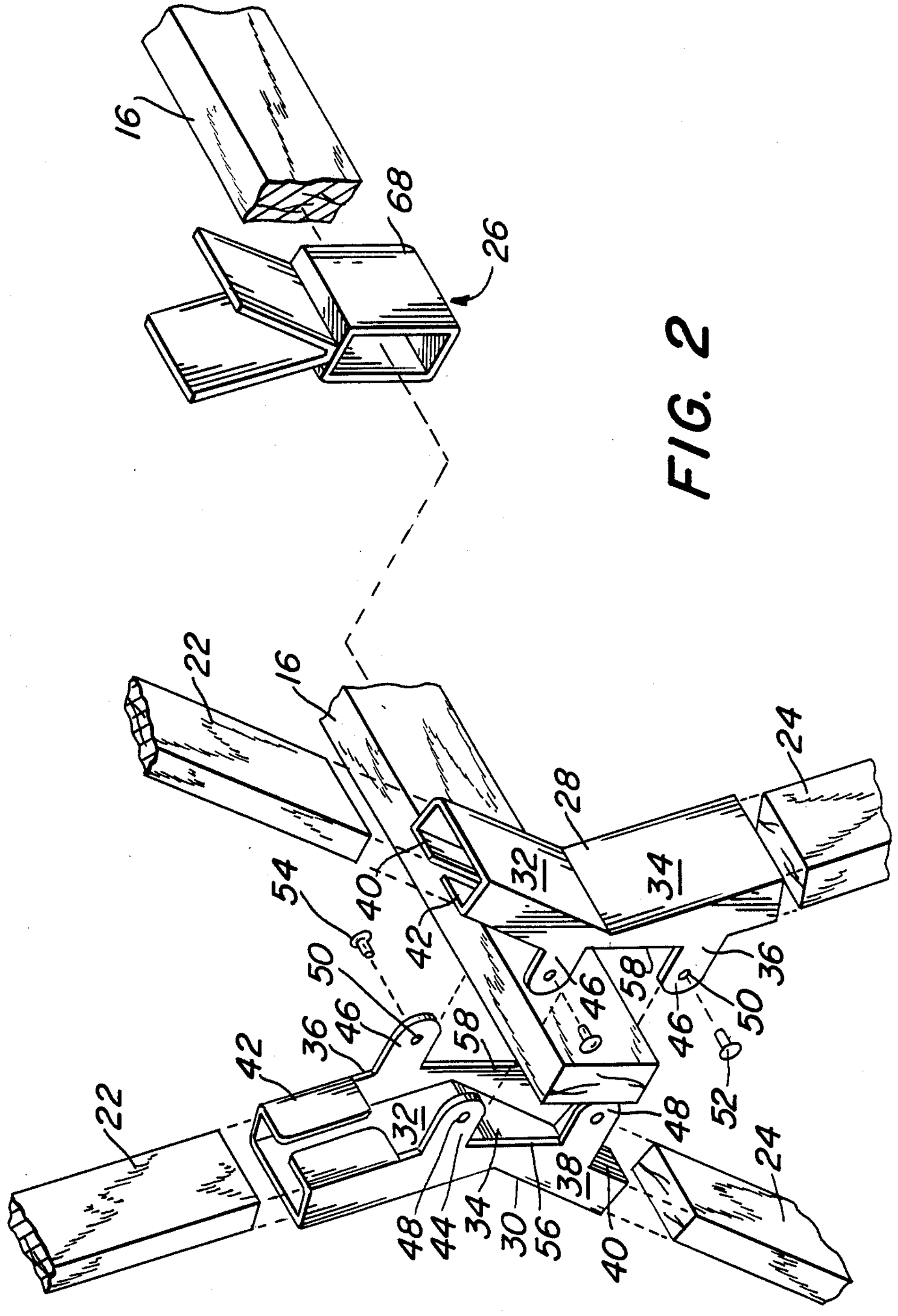
FIG. 2 is an exploded perspective view, showing details of the present invention.
Figure 4:
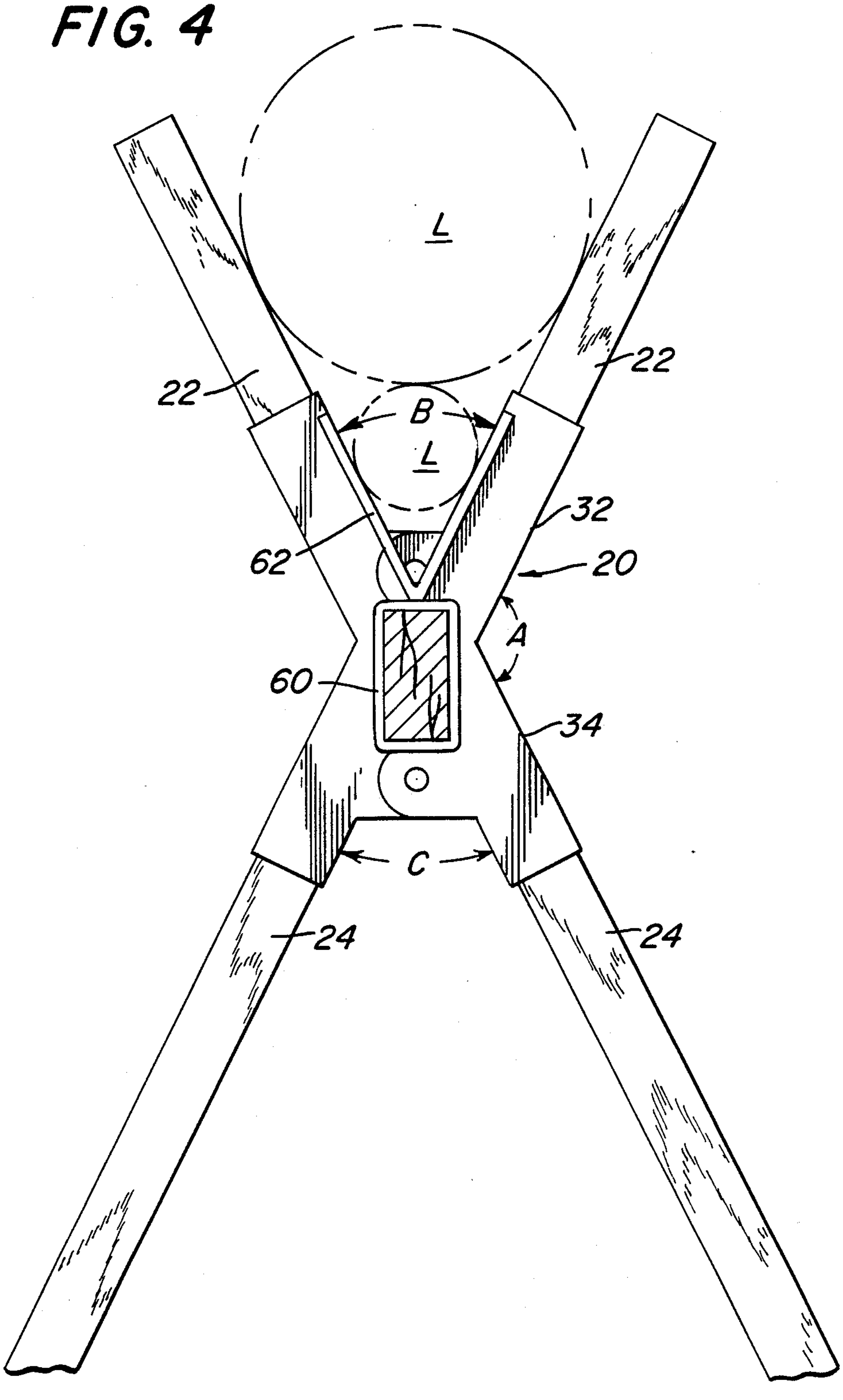
FIG. 4 is a cross-sectional view, taken along the line 4—4 in FIG. 1.

Referring now to FIGS. 2 and 4, the sleeve brackets 18 and 20, will now be described in detail.

Referring to FIG. 2, the sleeve bracket 18 (which is typical of the sleeve brackets) comprises a pair of open-mouthed (when seen in vertical plan view) channel members 28, 30, substantially identical in form. The channel members 28 and 30 include rear wall portions 32, 34, spaced generally parallel side wall portions 36, 38 and flange portions 40, 42 extending from the side wall portions 36, 38 and juxtaposed to the rear wall portion 32. The flange portions 40 and 42, it will be seen, are disposed generally parallel to the plane of the rear wall portions 32, 34 nearest them. Thus, the rear wall portions 32, 34, side wall portions 36, 38 and flange portions 40, 42 provide sockets for receiving ends of structural members such as the legs 24 and load supporting arms 22. Similar flange portions, not seen, are juxtaposed to the rear wall portion 34.

Figure 3:
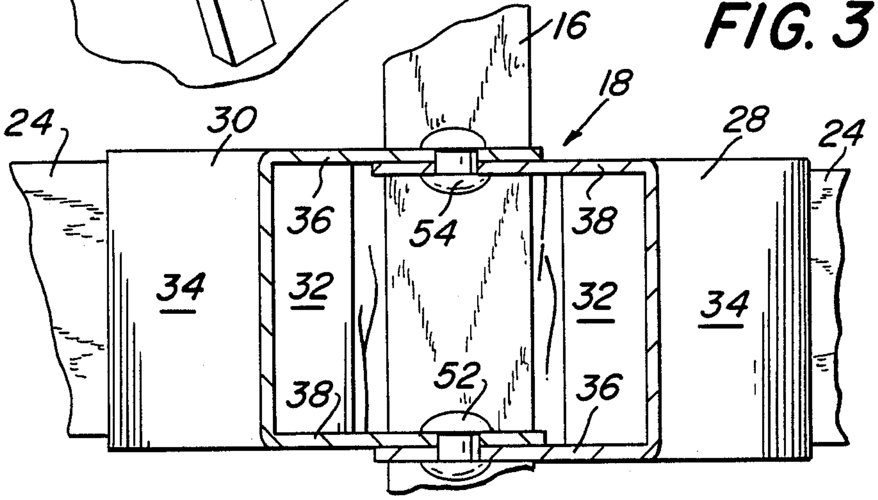
FIG. 3 is a cross-sectional view, taken along with line 3—3 in FIG. 1.

Referring now to FIGS. 2 and 3, the side wall portions 36, 38 of the channel members 28, 30 are secured together so that the respective channel members form unitary sleeve brackets 18, 20. Various techniques may be used to secure the channel members 28, 30 together, but riveting is presently preferred. In this regard, it may be seen that areas of the side wall portions 36, 38 are formed into ears for 44, 46, provided with openings 48, 50. The openings for 48, 50 associated with the respective channel members 28, 30 may be aligned, and rivets 52, 54 placed in the openings 48, 50 to secure together the channel members 28, 30 as desired.

Referring now to FIGS. 2, 3 and 4, it will be seen that the side wall portions 36, 38 of the channel members 28, 30 are provided with recesses as at 56 and 58 in FIG. 2, so as to provide, when the channel members 28, 30 are secured together, aligned openings in the respective side wall portions 36 and 38 into which the rail member 16 may be received. The recesses 56 and 58 define, therefore, a socket portion adapted to receive an end of the rail member 16.

The dimensions of the recesses 56 and 58 as well as the socket portions provided by the above-described rear wall portions 32 and flanges 40, 42 of the channel members 28, 30 may be so selected as to conform to the nominal dimensions of standard lumber. Moreover , the dimensions may be so selected that lumber may be snugly received in the various socket portions, without evident "play" and likewise without the need for tools to assemble the structure.

In FIG. 4, certain angular relationships determined by the configuration of the sleeve brackets 18, 20 are made apparent.

As is seen in FIG. 4, the rear wall portions 32 and 34 of the sleeve bracket 20 are angularly disposed with respect to each other by an obtuse angle "A", the angle "A" defining the relative angular dispositions of the arms 22 with respect to the legs 24. When the respective channel members 28 and 30 are secured together to form the above-described sleeve bracket 18, the angular dispositions of the rear wall portions 32 and 34 (as well as the flange portions 40, 42, not seen in FIG. 4) determine the angular relationship between the respective arms 22 (depicted by the angle "B" in FIG. 4), as well as the angular relationship between the respective legs 24 (depicted by the angle "C" in FIG. 4). Choice of a configuration in which the angles "B" and "C" are equal affords the manufacturing advantage of complete interchangeability of the channel members 28 and 30, but if, in a given instance, different angles were desired, such a configuration could be used consistently with the general principles of the present invention.

FIG. 4 illustrates the way in which logs of different sizes can rest within the sawbuck 10, in contact with the arms 22 or, as the case may be, the sleeve brackets 18, 20.

For long loads, the intermediate support 26 may be used with the rail member 16. Referring to FIGS. 1 and 4, the intermediate support 26 includes a sleeve portion 60 and a cradle-bracket 62 welded or otherwise affixed to an upper surface of the sleeve portion 60. The walls of the cradle bracket 62 preferably provide an angle corresponding to the angle "B", and in effect provide a support for long relatively thin work pieces, which may need for stability additional lateral support.

The channel members 28, 30 and intermediate support 26 may be made of steel, galvanized steel, aluminum, or other sheet metal of a suitable gage (12–26 being presently preferred), using conventional metal stamping, bending, or other forming techniques. Other materials capable of providing the needed strength, rigidity and durability, such as plastics or composites, may also be used.

The present invention may be embodied in other specific forms without departing from its spirit or essential attributes. Accordingly, reference should be made to the appended claims rather than the foregoing specification as indicating the scope of the invention.

I claim:

1. For use in a sawbuck comprising end supports having supporting legs and load-retaining arms and a horizontal rail member interconnecting said end supports, end supports comprising a sleeve bracket having angularly upwardly and angularly downwardly oriented socket portions therein, said upwardly and downwardly oriented socket portions being angularly oriented with respect to each other, said downwardly oriented socket portions being adapted to receive upper ends of respective supporting legs and said upwardly oriented socket portions being adapted to receive lower ends of respective load-retaining arms, said sleeve brackets comprising a pair of shell-like open-mouthed channel members having spaced side wall portions thereon, and means interconnecting respective side wall portions thereon of said channel members so that the open mouths of said channel members are juxtaposed and said channel members together form a unitary bracket, said channel members comprising rear wall portions, said side wall portions extending from said rear wall portions, and flange portions extending from said rear wall portions, and flange portions extending from said side wall portions and juxtaposed to said rear wall portions, said rear wall portions, said side wall portions and said flange portions providing said upwardly and downwardly oriented socket portions, said rear wall portions of said channel members having portions thereof angularly disposed with respect to each other by an obtuse angle, whereby said angularly upwardly oriented socket portions are angularly offset with respect to each other by an acute angle and said angularly downwardly oriented socket portions are angularly offset with respect to each other by an acute angle, and said side wall portions of said channel members providing an enclosed socket adapted to receive an end of said horizontal rail member.

2. Apparatus in accordance with claim 1, and recesses in said side wall portions of said channel members, said recesses defining, when said side wall portions of said channel members are interconnected, aligned openings in said side wall portions, said aligned openings providing said socket portions adapted to receive an end of said horizontal rail member.

* * * * *